United States Patent
Wang

(10) Patent No.: US 8,718,836 B2
(45) Date of Patent: May 6, 2014

(54) FAN CONTROL SYSTEM AND METHOD

(75) Inventor: Hsin-Fu Wang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 371 days.

(21) Appl. No.: 13/217,246

(22) Filed: Aug. 25, 2011

(65) Prior Publication Data

US 2012/0143389 A1 Jun. 7, 2012

(30) Foreign Application Priority Data

Dec. 1, 2010 (TW) .................. 99141814 A

(51) Int. Cl.
*G05D 23/00* (2006.01)

(52) U.S. Cl.
USPC ............... 700/300; 709/224; 370/392

(58) Field of Classification Search
USPC ............... 700/300; 709/224; 370/392
See application file for complete search history.

(56) References Cited

U.S. PATENT DOCUMENTS

| | | | |
|---|---|---|---|
| 7,843,907 B1* | 11/2010 | Abou-Emara et al. | 370/386 |
| 8,218,538 B1* | 7/2012 | Chidambaram et al. | 370/386 |
| 8,417,774 B2* | 4/2013 | Flynn et al. | 709/204 |
| 2006/0106577 A1* | 5/2006 | Hatakeyama | 702/183 |
| 2008/0072089 A1* | 3/2008 | Chang et al. | 713/330 |
| 2010/0153615 A1* | 6/2010 | Baba et al. | 710/316 |
| 2010/0169585 A1* | 7/2010 | Steinbrecher et al. | 711/154 |
| 2010/0170277 A1* | 7/2010 | Schmitt et al. | 62/259.2 |
| 2011/0199034 A1* | 8/2011 | Wu et al. | 318/471 |
| 2013/0117766 A1* | 5/2013 | Bax et al. | 719/323 |

* cited by examiner

*Primary Examiner* — Mohammad Ali
*Assistant Examiner* — Anthony Whittington
(74) *Attorney, Agent, or Firm* — Novak Druce Connolly Bove + Quigg LLP

(57) ABSTRACT

A computing device and method controls at least three fans installed in the computing device. Rotational speed of each of the fans is according to the temperature of a specific fan. The computing device reads the temperature of each of the fan by a baseboard management controller (BMC).

12 Claims, 3 Drawing Sheets

FAN CONTROL SYSTEM AND METHOD

BACKGROUND

1. Technical Field

The embodiments of the present disclosure relate to electronic device controlling systems and methods, and particularly to a fan control system and method.

2. Description of Related Art

A computing device fan (e.g., a CPU fan) is used for drawing cooler air into a case from outside of a computing device, and expelling warm air from inside of the computing device to cool a particular component (e.g., a CPU) of a computing device. Generally, the computing device fan adjusts a rotational speed of the fan according to a temperature of the particular component. For example, if the temperature of the CPU is between 40 degrees Celsius to 50 degrees Celsius, the CPU fan may rotate at 70 percentage of full speed. If the temperature is above 70 degrees Celsius, the CPU fan may rotate at the full speed. However, the computing device may include one or more fans (e.g., the CPU fan, a chipset fan, and a memory fan), where each computing device fan rotates independently. Increasing or decreasing the temperature frequently is a waste of energy and the cause of noise. More useful and convenient methods to control the computing device fans are desired.

DETAILED DESCRIPTION

The disclosure is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computing device-readable medium or other storage device. Some non-limiting examples of non-transitory computing device-readable media include CDs, DVDs, BLU-RAY, flash memory, and hard disk drives.

Figure 1:
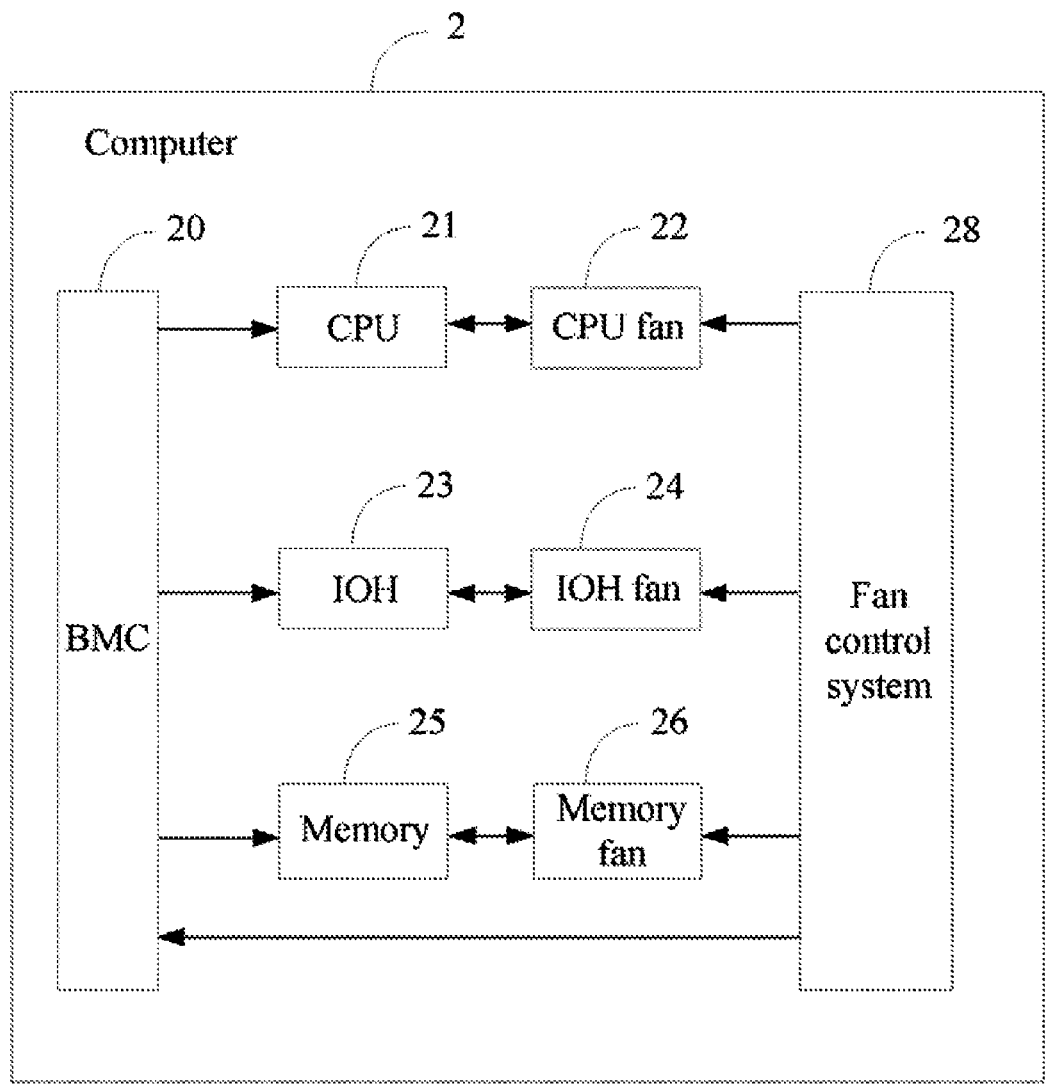
FIG. 1 is a system view of one embodiment of a computing device.

FIG. 1 is a system view of one embodiment of a computing device 2. In one embodiment, the computing device 2 may include a baseboard management controller (BMC) 20, a central processing unit (CPU) 21, a CPU fan 22, an input/output hub (IOH) 23, an IOH fan 24, a memory 25, a memory fan 26, and a fan control system 28. The fan control system 28 may be used to control the CPU fan 22, the IOH fan 24 and the memory fan 26 according to temperatures of surrounding environment of the CPU fan 22, the IOH fan 24 and the memory fan 26. Further details of the fan control system 28 will be described below. Depending on the embodiment, the computing device 2 may be a personal computer (PC), a network server, or any other data-processing equipment.

The BMC 20 is electronically connected to the CPU 21, the IOH 23 and the memory 25. In one embodiment, the CPU 21, the IOH 23 and the memory 25 may each include a temperature sensor (e.g., a thermocouple), where each of the temperature sensors measures a temperature of its host. The BMC 20 obtains temperatures of the CPU 21 from the temperature sensor of the CPU 21, obtains temperatures of the IOH 23 from the temperature sensor of the IOH 23, and obtains temperatures of the memory 25 from the temperature sensor of the memory 25. The temperatures of the CPU 21 are regarded as the temperatures of the CPU fan 22, the temperatures of the IOH 23 are regarded as the temperatures of the IOH fan 24, and the temperatures of the memory 25 are regarded as the temperatures of the memory fan 26. In one embodiment, the IOH 23 may be, but not limited to, a north bridge.

The CPU fan 22 serves the CPU 21 and the speed of the CPU fan 22 is adjustable to cool the CPU 21 according to the temperatures of the CPU 21. In this embodiment, the CPU fan 22 may be installed on top of the CPU 21. The IOH fan 24 is connected to the IOH 23. The IOH fan 24 adjusts the rotational speed to cool the IOH 23 according to the temperatures of the IOH 23. In this embodiment, the IOH fan 24 may be installed on the top of the IOH 23. The memory fan 26 is connected to the memory 25. The memory fan 26 adjusts the rotational speed to cool the memory 25 according to the temperatures of the memory 25. In one embodiment, the memory fan 26 may be attached to a chassis of the computing device 2.

Figure 2:
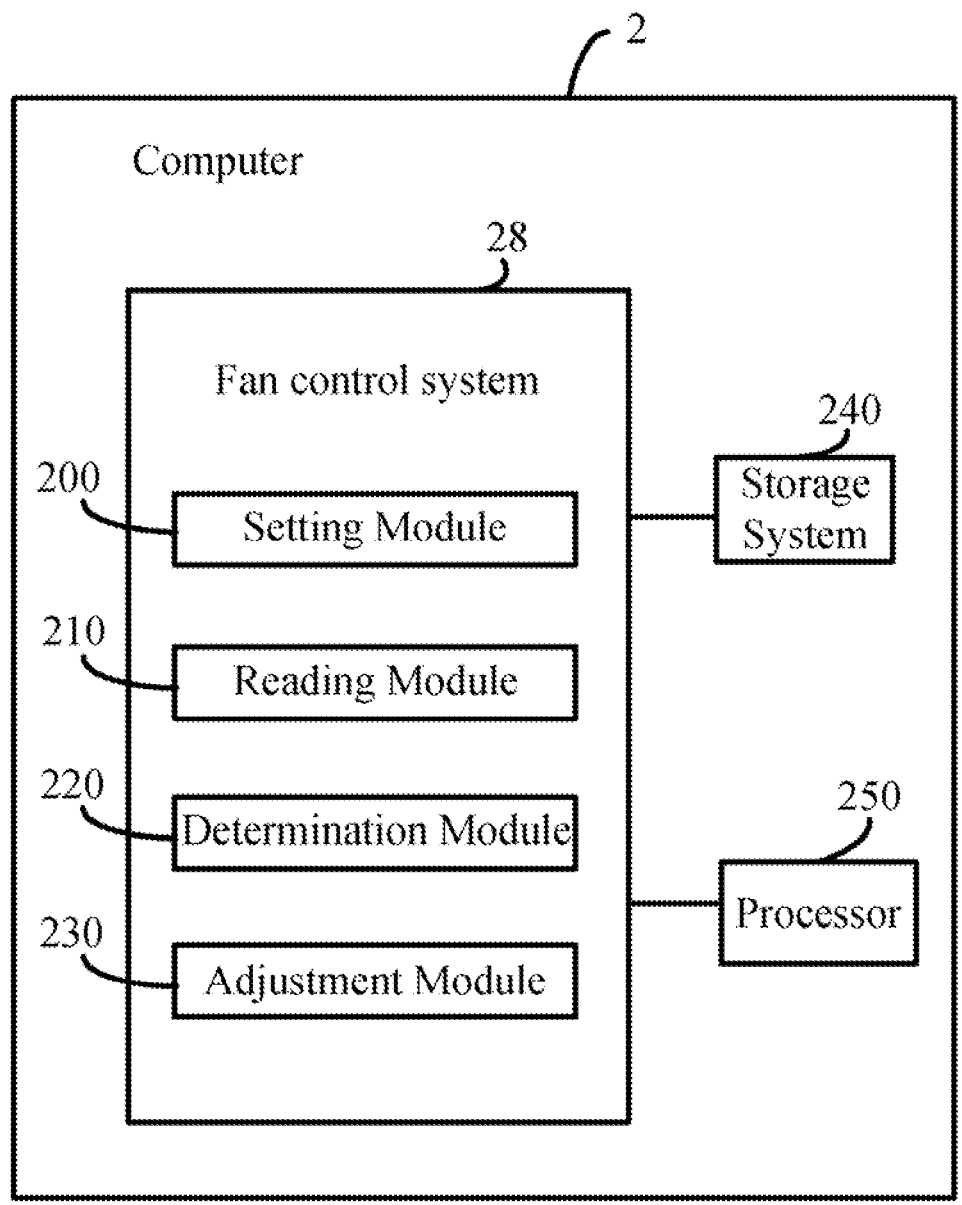
FIG. 2 is a block diagram of one embodiment of a fan control system in the computing device of FIG. 1.

FIG. 2 is a block diagram of one embodiment of function modules of the fan control system 28. In one embodiment, the computing device 2 includes a storage system 240, and at least one processor 250. In one embodiment, the fan control system 28 includes a setting module 200, a reading module 210, a determination module 220, and an adjustment module 230. The modules 200-230 may include computerized code in the form of one or more programs that are stored in the storage system 240. The computerized code includes instructions that are executed by the at least one processor 250 to provide the functions of the modules 200-230. The storage system 240 may be a cache or a memory, such as an EPROM or a flash.

The setting module 200 sets temperature ranges for adjusting the rotational speed of the CPU fan 22, the IOH fan 24 and the memory fan 26.

In one embodiment, the setting module 200 may create a lookup table for the CPU fan 22 to show temperature ranges for adjusting the rotational speed of the CPU fan 22. One example of the lookup table for the CPU fan 22 is shown as follows:

| | T (unit: Celsius temperature) | | | CPU fan |
|---|---|---|---|---|
| | Lowest | Temperature range | Highest | Target: CPU percentage of full speed |
| 1 | | T ≤ 45 | 45 | 50% |
| 2 | 45 | 45 < T ≤ 50 | 50 | 55% |
| 3 | 50 | 50 < T ≤ 55 | 55 | 65% |
| 4 | 55 | 55 < T ≤ 60 | 60 | 75% |
| 5 | 60 | 60 < T ≤ 65 | 65 | 90% |
| 6 | 65 | T > 65 | | 100% |

According to the above table, the rotational speed of the CPU fan 22 is determined by the temperatures. For example, if the full speed of the CPU fan 22 is 1000 revolutions per minute and the temperature is 36 degrees Celsius, the rotational speed required from the fan 22 is 50% of the full speed according to the above table, namely the rotational speed of the CPU fan 22 is 500 revolutions per minute.

In one embodiment, the setting module 200 also creates a table for the IOH fan 24 to show temperature ranges for adjusting a rotational speed of the IOH fan 24. The table for the IOH fan 24 is shown as follows:

| | T (unit: Celsius) | | IOH fan |
|---|---|---|---|
| | Temperature | | Target: IOH |
| Lowest | range | Highest | percentage of full speed |
| 1 | T ≤ 45 | 45 | 60% |
| 2 | 45 | 45 < T ≤ 50 | 50 | 70% |
| 3 | 50 | 50 < T ≤ 55 | 55 | 90% |
| 4 | 55 | 55 < T ≤ 60 | 60 | 90% |
| 5 | 60 | 60 < T ≤ 65 | 65 | 100% |
| 6 | 65 | T > 65 | | 100% |

According to the above table, the rotational speed of the IOH fan 24 is determined by the temperatures of the surrounding environment of the IOH fan 24. For example, if the full speed of the IOH fan 24 is 800 revolutions per minute and the temperature is 46 degrees Celsius, the rotational speed is 70% of the full speed according to the above table, namely the rotational speed of the IOH fan 24 is 560 revolutions per minute.

In one embodiment, the setting module 200 further creates a table for the memory fan 26 to show temperature ranges for adjusting a rotational speed of the memory fan 26. One example of the table for the memory fan 26 is shown as follows:

| | T (unit: Celsius) | | Memory fan |
|---|---|---|---|
| | Temperature | | Target: memory |
| Lowest | range | Highest | percentage of full speed |
| 1 | T ≤ 45 | 45 | 50% |
| 2 | 45 | 45 < T ≤ 50 | 50 | 55% |
| 3 | 50 | 50 < T ≤ 55 | 55 | 65% |
| 4 | 55 | 55 < T ≤ 60 | 60 | 75% |
| 5 | 60 | 60 < T ≤ 65 | 65 | 90% |
| 6 | 65 | T > 65 | | 100% |

According to the above table, the rotational speed of the memory fan 26 is determined by the temperatures of the surrounding environment of the memory fan 26. For example, if the full speed of the memory fan 26 is 1200 revolutions per minute and the temperature is 64 degrees Celsius, the rotational speed is 90% of the full speed according to the above table, namely the rotational speed of the memory fan 26 is 1080 revolutions per minute.

The reading module 210 reads a temperature of the surrounding environment of the IOH 24 and the rotational speed of the IOH fan 24 by the BMC 20. In one embodiment, the reading module 210 may read the temperature of the surrounding environment of the IOH 24 from the thermocouple of the IOH 24.

The determination module 220 determines if the temperature corresponding to the rotational speed of the IOH fan 24 falls within the temperature ranges of the IOH fan 24. For example, assuming that the rotational speed of the IOH fan is 560 revolutions per minute, the temperature range is supposed to be 45<T≤50 according to the table for the IOH fan 24. If the read temperature of the surrounding environment of the IOH 23 in this example is actually 43 degrees Celsius, the determination module 220 may determine that the rotational speed of the IOH fan 24 needs to be adjusted from 560 revolutions per minute to 480 revolutions per minute.

The adjustment module 230 adjusts the rotational speed of the CPU fan 22, the rotational speed of the IOH fan 24 and the rotational speed of the memory fan 26 according to the temperature of the IOH, in response to a determination that the temperature corresponding to the rotational speed of the IOH fan 24 does not fall into the temperature ranges of the IOH fan 24. For example, if the temperature of the surrounding environment of the IOH 23 is 43 degrees Celsius, the IOH fan 24 adjusts the rotational speed to 480 revolutions per minute. In one embodiment, if the temperature corresponding to the rotational speed of the IOH fan 24 does not fall into the temperature ranges of the IOH fan 24, the temperature of the surrounding environment of the IOH 23 is interpreted as the temperature of the CPU 21 to adjust the rotational speed of the CPU fan 22. For example, if the temperature of the surrounding environment of the IOH 23 is 43 degrees Celsius, the CPU fan 24 adjusts the rotational speed to 500 revolutions per minute. In one embodiment, if the temperature corresponding to the rotational speed of the IOH fan 24 does not fall into the temperature ranges of the IOH fan 24, the temperature of the surrounding environment of the IOH 23 is also interpreted as the temperature of the surrounding environment of the memory 25 to adjust the rotational speed of the memory fan 26. For example, if the temperature of the IOH 23 is 43 degrees Celsius, the memory fan 26 adjusts the rotational speed to 600 revolutions per minute.

The reading module 210 reads the temperature of the surrounding environment of the IOH 23, the temperature of the surrounding environment of the CPU 21 and the temperature of the surrounding environment of the memory 25 by the BMC 20.

The adjustment module 230 adjusts the rotational speed of the CPU fan 22 according to the temperature of the surrounding environment of the CPU 21, the rotational speed of the surrounding environment of the IOH fan 24 according to the temperature of the IOH 23 and the rotational speed of the memory fan 26 according to the temperature of the surrounding environment of the memory 25.

Figure 3:
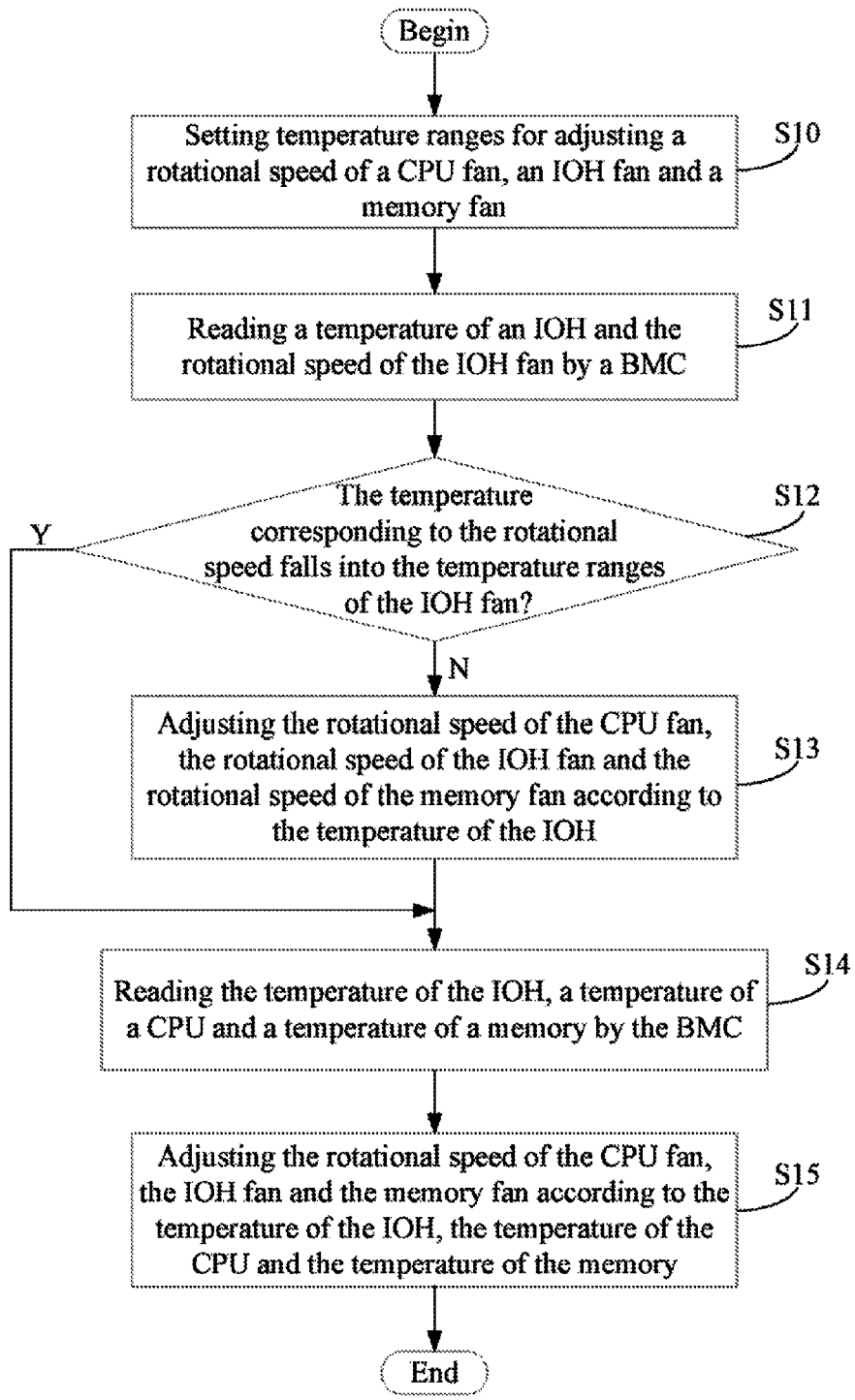
FIG. 3 is a flowchart of one embodiment of a fan control method.

FIG. 3 is a flowchart of one embodiment of a fan control method. Depending on the embodiment, additional blocks may be added, others deleted, and the ordering of the blocks may be changed.

In block S10, the setting module 200 sets temperature ranges for adjusting a rotational speed of the CPU fan 22, the IOH fan 24 and the memory fan 26. As mentioned above, the setting module 200 creates a table for the CPU fan 22 to show temperature ranges for adjusting a rotational speed of the CPU fan 22. Furthermore, the setting module 200 also creates a table for the IOH fan 24 to show temperature ranges for adjusting a rotational speed of the IOH fan 24. Additionally, the setting module 200 further creates a table for the memory fan 26 to show temperature ranges for adjusting a rotational speed of the memory fan 26.

In block S11, the reading module 210 reads a temperature of the surrounding environment of the IOH 24 and the rotational speed of the IOH fan 24 by the BMC 20. As mentioned above, the reading module 210 reads the temperature of the IOH 24 from the thermocouple of the IOH 24.

In block S12, the determination module 220 determines if the temperature corresponding to the rotational speed of the IOH fan 24 falls within the temperature ranges of the IOH fan 24. In one embodiment, assuming that the rotational speed of the IOH fan is 560 revolutions per minute, the temperature range is supposed to be 45<T≤50 according to the table for the IOH fan 24. If the temperature of the surrounding environment of the IOH 23 is 43 degrees Celsius, the IOH fan 24 needs to adjust the rotational speed to 480 revolutions per minute, the procedure goes to S13. Otherwise, if the temperature of the surrounding environment of the IOH 23 is 46 degrees Celsius, the procedure goes to the block S14.

In block S13, the adjustment module 230 adjusts the rotational speed of the CPU fan 22, the rotational speed of the IOH fan 24 and the rotational speed of the memory fan 26 according to the temperature of the surrounding environment of the IOH 23. For example, if the temperature of the IOH 23 is 43 degrees Celsius, the IOH fan 24 adjusts the rotational speed to 480 revolutions per minute, the CPU fan 24 adjusts the rotational speed to 500 revolutions per minute, the memory fan 26 adjusts the rotational speed to 600 revolutions per minute.

In block 514, the reading module 210 reads the temperature of the surrounding environment of the IOH 23, the temperature of the surrounding environment of the CPU 21 and the temperature of the surrounding environment of the memory 25 by the BMC 20.

The adjustment module 230 adjusts the rotational speed of the CPU fan 22 according to the temperature of the surrounding environment of the CPU 21, the rotational speed of the IOH fan 24 according to the temperature of the surrounding environment of the IOH 23 and the rotational speed of the memory fan 26 according to the temperature of the surrounding environment of the memory 25. For example, if the temperature of the IOH 23 is 43 degrees Celsius, the IOH fan 24 adjusts the rotational speed to 480 revolutions per minute. If the temperature of the IOH 23 is 56 degrees Celsius, the CPU fan 24 adjusts the rotational speed to 750 revolutions per minute. If the temperature of the IOH 23 is 48 degrees Celsius, the memory fan 26 adjusts the rotational speed to 650 revolutions per minute.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computing device, comprising:
   a baseboard management controller (BMC);
   at least three fans;
   a storage system;
   at least one processor; and
   one or more programs stored in the storage system and being executable by the at least one processor, the one or more programs comprising:
   a setting module operable to set temperature ranges for adjusting a rotational speed of each of the at least three fans;
   a reading module operable to read a temperature of a surrounding environment of a specific fan of the at least three fans and a rotational speed of the specific fan by the BMC;
   a determination module operable to determine if the temperature corresponding to the rotational speed of the specific fan falls within a temperature range of the specific fan;
   an adjustment module operable to adjust the rotational speed of each of the at least three fans according to the temperature of the surrounding environment of the specific fan, in response to a determination that the temperature corresponding to the rotational speed of the specific fan does not fall into the temperature range of the specific fan;
   the reading module further operable to read the temperature of the surrounding environment of each of the at least three fans by the BMC; and
   the adjustment module operable to adjust the rotational speed of each fan according to the temperature of the surrounding environment of each of the at least three fans.

2. The computing device of claim 1, wherein the at least three fans are selected from the group consisting of a central processing unit (CPU) fan, an input output hub (IOH) fan, a memory fan.

3. The computing device of claim 1, wherein the specific fan is the IOH fan.

4. The computing device of claim 2, wherein the BMC reads the temperature of the surrounding environment of the IOH fan from an IOH, the temperature of the surrounding environment of the CPU fan from a CPU and the temperature of the surrounding environment of the memory fan from a memory.

5. A fan control method implemented by a computing device, the computing device comprising a baseboard management controller (BMC), and at least three fans, the method comprising:
   setting temperature ranges for adjusting a rotational speed of each of the at least three fans;
   reading a temperature of a specific fan of the at least fans and a rotational speed of the specific fan by the BMC;
   determining if the temperature corresponding to the rotational speed of the specific fan falls within a temperature range of the specific fan;
   adjusting the rotational speed of each of the at least three fans according to the temperature of the specific fan, in response to a determination that the temperature corresponding to the rotational speed of the specific fan does not fall into the temperature range of the specific fan;
   reading the temperature of the surrounding environment of each of the at least three fans by the BMC; and
   adjusting the rotational speed of each of the at least three fans according to the temperature of the surrounding environment of each of the at least three fans.

6. The method of claim 5, wherein the at least three fans are selected from the group consisting of a central processing unit (CPU) fan, an input output hub (IOH) fan, a memory fan.

7. The method of claim 5, wherein the specific fan is the IOH fan.

8. The method of claim 6, wherein the BMC reads the temperature of the surrounding environment of the IOH fan from an IOH, the temperature of the surrounding environment of the CPU fan from a CPU and the temperature of the surrounding environment of the memory fan from a memory.

9. A non-transitory computing device-readable medium having stored thereon instructions that, when executed by a computing device, the computing device comprising a baseboard management controller (BMC), a CPU comprising a CPU fan, and at least three fans, causing the computing device to perform a fan control method, the method comprising:
   setting temperature ranges for adjusting a rotational speed of each of the at least three fans;
   reading a temperature of a surrounding environment of a specific fan of the at least fans and a rotational speed of the specific fan by the BMC;
   determining if the temperature corresponding to the rotational speed of the specific fan falls within a temperature range of the specific fan;

adjusting the rotational speed of each of the at least three fans according to the temperature of the surrounding environment of the specific fan, in response to a determination that the temperature corresponding to the rotational speed of the specific fan does not fall into the temperature range of the specific fan;

reading the temperature of the surrounding environment of each of the at least three fans by the BMC; and adjusting the rotational speed of each of the at least three fans according to the temperature of the surrounding environment of each of the at least three fans.

10. The medium of claim 9, wherein the at least three fans are selected from the group consisting of a central processing unit (CPU) fan, an input output hub (IOH) fan, and a memory fan.

11. The medium of claim 9, wherein the specific fan is the IOH fan.

12. The method of claim 10, wherein the BMC reads the temperature of the IOH fan from an IOH, the temperature of the CPU fan from a CPU and the temperature of the memory fan from a memory.

* * * * *